3,528,994
AMIDES OF β-(3-THIANAPHTHENYL)
ETHYLAMINES
John T. Suh, Mequon, Wis., assignor to Colgate-Palmolive Company, New York, N.Y., a corporation of Delaware
No Drawing. Filed May 5, 1967, Ser. No. 636,274
Int. Cl. C07d 63/18
U.S. Cl. 260—330.5                    5 Claims

ABSTRACT OF THE DISCLOSURE

The compounds are amides of β-(3-thianaphthenyl)-ethylamines which are useful as antipsychotic, antihypertensive and analgetic agents. The amides are preferably prepared by reacting a β-(3-thianaphthenyl)ethylamine with an acyl chloride. A species disclosed is N-(3,4 - dimethoxyphenylacetyl)-β-(3-thianaphthenyl)ethylamine.

SUMMARY OF THE INVENTION

The present invention relates to the amides of β-(3-thianaphthenyl)ethylamines, novel pharmaceutical compositions containing them, methods of preparing such compounds and therapeutic metthods employing them.

DETAILED DESCRIPTION

The amides of the present invention have the following formula:

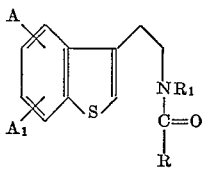

wherein A and $A_1$ are selected from hydrogen, hydroxy, nitro, lower alkyl groups of 1 to 4 carbon atoms such as methyl, ethyl and isopropyl, lower alkoxy groups such as methoxy, ethoxy and propoxy, halo such as brom, chloro and fluoro and trifluoromethyl, $R_1$ is hydrogen, lower alkyl of 1 to 4 carbon atoms or a phenyl-lower alkyl, R is an alkyl of 1 to 8 carbon atoms such as methyl, ethyl, butyl, isopropyl and hexyl, a lower alkoxy of 1 to 4 carbon atoms, an aralkyl of 7 to 16 carbon atoms, particularly a phenyl-lower alkyl such as benzyl, phenethyl, phenylisopropyl, phenylisobutyl and phenylbutyl, and including substituted aralkyls such as 3,4-dihydroxybenzyl, 3,4-dimethoxybenzyl, α-isopropyl-3,4-dihydroxybenzyl, α-cyclopropyl-3,4-dimethoxybenzyl and α-cyclohexl-3,4-dihydroxybenzyl, p-chlorobenzyl and p-methoxybenzyl, phenyl, a nuclear substituted phenyl such as p-methoxy phenyl and o-chlorophenyl, an alkenyl of 3 to 6 carbon atoms such as allyl and hexenyl, a cycloalkyl of 3 to 7 carbon atoms such as cyclopropyl and cyclohexyl, a cycloalkyl-lower alkyl in which the cycloalkyl contains 3 to 7 carbon atoms such as cyclohexyl-methyl and cyclopentyl-ethyl, nitro-lower alkyl such as nitro ethyl, and B-Am in which B is an alkylene of 1 to 6 carbon atoms and Am is selected from
(a)

in which $R_2$ and $R_3$ may be the same or different groups selected from hydrogen, lower alkyl of 1 to 4 carbon atoms, lower alkyl tertiary amino such as diethylaminoethyl, hydroxy-lower alkyl such as hydroxethyl, a lower alkenyl of 3 to 6 carbon atoms such as allyl and hexenyl, phenyl, nuclear substituted phenyl, particularly a halophenyl such as o-chlorophenyl and an alkoxyphenyl such as p-methoxyphenyl, an aralkyl of 7 to 16 carbon atoms, cycloalkyl groups, particularly those containing 3 to 7 carbon atoms and including cyclohexyl and cyclopentyl, cycloalkyl lower alkyl groups, particularly those in which the cycloalkyl contains 3 to 7 carbon atoms such as cyclohexyl-methyl and cyclopentyl-ethyl,
(b) Groups in which

represents an amino group such as morpholino, pyrrolidino, piperidino, N-lower alkyl piperazino groups such as N-methyl-piperazino, N-(phenyl-lower alkyl)-piperazino groups such as N-benzyl-piperazino and 4-(alpha-methylphenethyl)piperazino and N-(hydroxy-lower al kyl)-piperazino groups such as 4-(beta-hydroxyethyl)-piperazino, and (c) Am is a cyclic amine group bonded through a nuclear carbon to B, including such groups at N-lower alkyl-2,3 or 4-piperidyls such as N-methyl-3-piperidyl, N-ethyl-4-piperidyl, N-ethyl-2-piperidyl and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl)-3-piperidyl and N-(beta-dimethylaminopropyl) - 2 - piperidyl, N-phenyl-lower alkyl-3 or 4-piperidyls such as N-benzyl-3-piperidyl, N-phenylethyl-4-piperidyl and N-phenylpropyl-3-piperidyl, 2-piperidyl, 3-piperidyl and 4-piperidyl, 2-pyrrolidyl, 3-pyrrolidyl, N-lower alkyl-2- or 3-pyrrolidyls such as N-methyl-2-pyrrolidyl, N-ethyl-3-pyrrolidyl, N-propyl-4-pyrrolidyl, and N-phenyl-lower alkyl-2 or 3-pyrrolidyls such as N-benzyl-2-pyrrolidyl and N-phenyl-ethyl-3-pyrrolidyl.

The basic starting materials employed in the preparation of the compounds of the present invention are β-(3-thianaphthenyl)ethylamines of the formula

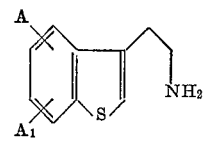

Thes amines may be prepared from the corresponding cyano compounds as described in the literature. (Herz J.A.C.S. 72, p. 4999 (1950).)

The amine starting materials may also be prepared by treating the corresponding acid with thionyl chloride, followed by treatment with sodium azide and acid hydroylsis. The process may be illustrated as follows:

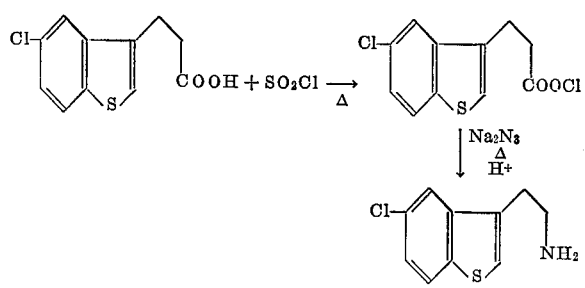

The amines in which $R_1$ is other than hydrogen may be readily prepared by conventional alkylation techniques. One such procedure is the direct alkylation by treating the unsubstituted amine with a desired acyl halide followed by reduction with an alkali metal hydride, such as lithium aluminum hydride. The amines in which $R_1$ is methyl are conveniently prepared by treating the unsubstituted amine with ethylchloroformate followed by treatment with an alkali metal hydride.

Representative of the amines which may be employed are the following:

β-(3-thianaphthenyl)ethylamine,
β-(5-chloro-3-thianaphthenyl)ethylamine,
β-(5-hydroxy-3-thianaphthenyl)ethylamine,
β-(6-trifluoromethyl-3-thianaphthenyl)ethylamine,
N-methyl-β-(5-chloro-3-thianaphthenyl)ethylamine,
N-ethyl-β-(3-thianaphthenyl)ethylamine,
N-benzyl-β-(3-thianaphthenyl)ethylamine,
β-(7-methoxy-3-thianaphthenyl)ethylamine, and
β-(4-bromo-3-thianaphthenyl)ethylamine.

The amides employed in the compositions of the present invention may be conveniently prepared by treating the selected amine with an appropriate acylating agent such as an acyl halide, acid anhydride, a mixed anhydride, or an ester in a suitable solvent such as benzene, toluene or xylene, preferably at reflux temperature to form the amide.

The above reaction may be diagrammed as follows:

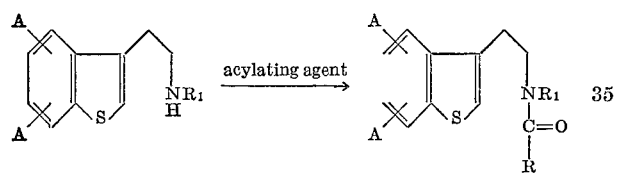

wherein A and $A_1$ are as described and represent groups that do not interfere with or partake in the reactions.

Representative of the acylating agents which may be employed are the following:

Acetyl chloride,
Acetyl bromide,
Acryloyl chloride,
β-Nitropropionyl chloride,
Propionyl chloride,
Propionyl iodide,
n-Butyryl chloride,
Isobutyryl chloride,
Benzoyl chloride,
Acetic anhydride,
Propionic anhydride,
Ethyl formate,
Benzyl formate,
p-Methoxyphenylacetyl chloride,
3,4-dimethoxyphenylacetyl chloride,
α-iso-Propyl-3,4-dimethoxyphenylacetyl chloride,
α-Cyclohexyl-3,4-dimethoxyphenylacetyl chloride,
γ-(N-methylpiperazino)butyryl chloride,
β-(N-methylpiperazino)propionyl chloride,
β-(Morpholino)propionyl chloride,
β-[3-(N-methyl)pyrrolidyl]propionyl chloride, and
γ-(Piperidyl)butyryl chloride.

Representative of some of the amides prepared by the process are the following:

N-β-(3-thianaphthenyl)ethylacetamide,
N-[β-(3-thianaphthenyl)ethyl]-3-nitropropionamide,
N-(3',4'-dimethoxyphenylacetyl)-β-(3-thianaphthenyl)ethylamine,
N-(3',4'-dihydroxyphenylacetyl)-β-(3-thianaphthenyl)ethylamine,
N-(3',4'-dimethoxyphenylacetyl)-β-(5-hydroxy-3-thianaphthenyl)ethylamine,
N-(3',4'-dihydroxyphenylacetyl)-β-(5-hydroxy-3-thianaphthenyl)ethylamine,
N-acryloyl-3-(β-aminoethyl)thianaphthene,
N-propionyl-3-(β-aminoethyl)thianaphthene,
N-p-methoxyphenylacetyl-3-(β-aminoethyl)thianaphthene,
N-iso-butyryl-3-(β-aminoethyl)thianaphthene,
N-butyryl-3-(β-aminoethyl)thianaphthene,
N-[β-(N'-methylpiperazino)propionyl]-β'-(3-thianaphthenyl)ethylamine,
N-methyl-N-[β-(diethylamino)propionyl]-β'-(5-chloro-3-thianaphthenyl)ethylamine,
N-β-morpholinopropionyl-β'-(6-trifluoromethyl-3-thianaphthenyl)ethylamine,
N-β-[3-(N'-ethyl)pyrrolidyl]propionyl-β'-(7'-methoxy-3'-thianaphthenyl)ethylamine,
N-dimethylaminoacetyl-β-(5-fluoro-3-thianaphthenyl)ethylamine,
N-γ-(diethylamino)butyryl-β'-(5-hydroxy-3-thianaphthenyl)ethylamine,
N-β-(N'-hydroxyethylpiperazino)propionyl-β'-(5-trifluoromethyl-3-thianaphthenyl)ethylamine,
N-(α-iso-propyl-3',4'-dihydroxyphenylacetyl)-β-(5-methoxy-3-thianaphthenyl)ethylamine, and
N-(α-cyclohexyl-3',4'-dihydroxyphenylacyl)-β-(5-trifluoromethyl-3-thianaphthenyl)ethylamine.

The amides in which R is B-Am and B is ethylene may also be conveniently prepared by first treating the selected amine starting material with an acryloyl halide, such as acryloyl chloride, followed by treatment with an amine.

The described process may be illustrated as follows:

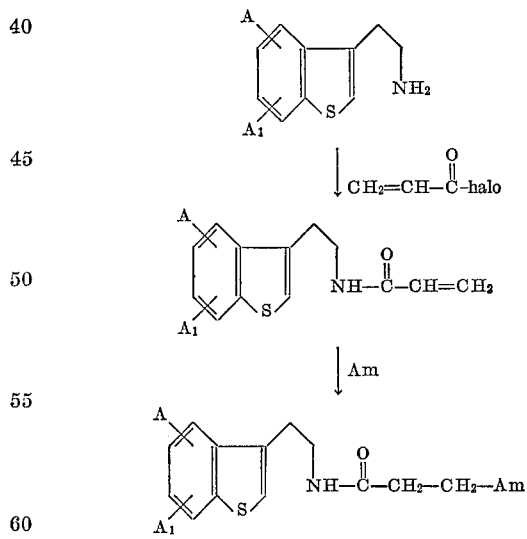

wherein A and $A_1$ are as described and do not partake in or interfere with the reaction.

The above described process provides a convenient means of preparing those compounds which might otherwise be difficult or expensive to prepare because of the unavailability of the amino acyl halides.

The amides in which $R_1$ is other than hydrogen may be prepared in the manner previously described by employing an appropriate substituted amine or in a variety of other manners. For example, an amide such as the methyl amide can be reduced to form the N-substituted derivative, which can in turn be reacted with an acyl chloride to form the desired N-substituted amide. The process may be illustrated as follows:

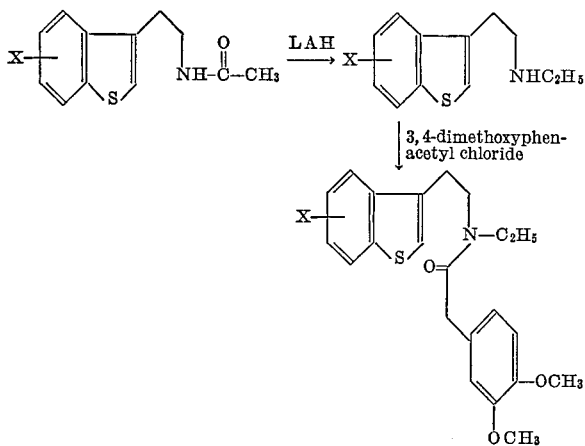

in which X is as previously described and does not interfere with or partake in the reaction.

The amides in which $R_1$ is other than hydrogen may also be prepared by direct alkylation of the corresponding unsubstituted amide. The process may be illustrated as follows:

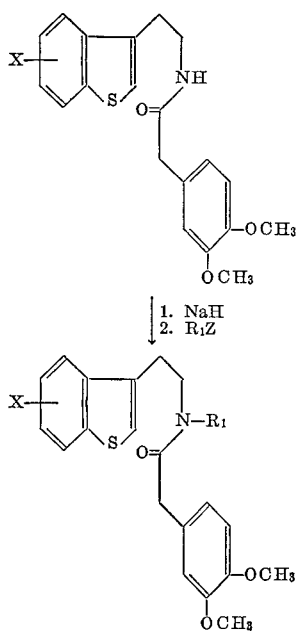

in which Z is a reactive halide and X is as previously described and represents groups that do not interfere with or partake in the reaction.

The amides in which R is a hydroxy substituted phenyl-lower alkyl are preferably prepared by the hydrolysis of the corresponding methoxy substituted derivative. The process may be illustrated as follows:

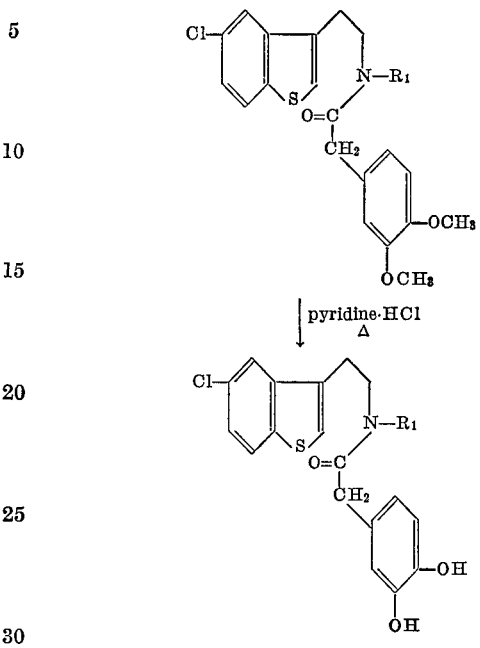

wherein $R_1$ is as previously defined and does not partake in or interfere with the reaction.

The described amides have been found to be useful when combined with pharmaceutical diluents and formed into unit dosage forms in methods for reducing aggressiveness in animals. To illustrate the compound, N-(3,4-dimethoxyphenylacetyl) - β - (3-thianaphthenyl)ethylamine is effective in decreasing the antisocial aggressiveness, viciousness and persistency in fighting among 50% of the isolated mice receiving about 5 mg./kg. The compound in large doses, 20–30 mg./kg. is an effective analgetic agent.

The compounds, N - propionyl-3-(β-aminoethyl)thianaphthene, N-iso-butyryl-3-(β-aminoethyl)thianaphthene, and N-[β-chloro-3-thianaphthenyl)ethyl]urethan are also effective in decreasing antisocial behavior in isolated mice in intraperitoneal doses of approximately 40 mg./kg., 20 mg./kg. and 20 mg./kg., respectively.

The compounds N-(3,4-dimethoxyphenylacetyl)-β-(3-thianaphthenyl)ethylamine, N-acryloyl-3-(β-aminoethyl)-thianaphthene, N - p - methoxyphenylacetyl-3-(β-aminoethyl)thianaphthene, N-iso-butyryl-3-(β-aminoethyl)thianaphthene and N-butyryl-3-(β-aminoethyl)thianaphthene reduced the blood pressure of the standard anesthesized dog preparation in intravenous doses approximating 10 mg./kg. of the active ingredient.

The amides are also useful intermediates which may be reacted with phosphorus pentoxide and phosphorus oxychloride, or lithium aluminum hydride to prepare more complex pharmaceutical compounds such as 1-aminoalkyl-1,2,3,4 - tetrahydrobendothieno[2,3 - C]pyridine and 2 - β-diethylaminopropionyl-1-phenyl-1,2,3,4-tetrahydrobenzothieno[2,3-C]pyridine which also possess antipsychotic properties.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like, may also be employed.

The unit dosage forms may contain a concentration of 0.1% to 10% or more by weight of one or more of the novel compounds. Generally, such dosage forms will contain about 5 to 500 mg. of the active ingredients. One or more of such dosage forms may be administered daily.

A typical tablet may have the following composition:

|   | Mg. |
|---|---|
| (1) Active ingredients | 20 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

Capsules may be prepared by filling No. 3 hard gelatin capsules with a mixture of the following ingredients:

|   | Mg. |
|---|---|
| (1) Active ingredients | 15 |
| (2) Lactose U.S.P. | 200 |
| (3) Starch U.S.P. | 16 |
| (4) Talc U.S.P. | 8 |

The following examples are presented to illustrate this invention.

EXAMPLE 1

β-(3-thianaphthenyl)ethylamine

To a suspension of 21 g. (0.55 mole) of lithium aluminum hydride in 450 ml. of anhydrous ether is added a solution of 31.7 g. (0.18 mole) of 3-cyanomethylthianaphthene in 350 ml. of anhydrous ether in 45 minutes. The mixture is stirred at room temperature for 3 hours after which the complex is decomposed by the dropwise addition of 80 ml. of water. The solids are removed by filtration and washed with ether. The filtrate is dried and concentrated in vacuo to yield a brown oil which is fractioned to yield β-(3-thianaphthenyl)ethylamine in the form of a clear liquid, B.P. 109–10°/0.3 mm.

*Analysis.*—Calcd. for $C_{10}H_{11}NS$ (percent): C, 67.75; H, 6.26; N, 7.90. Found (percent): C, 67.49; H, 6.50; N, 7.92.

EXAMPLE 2

N-β-(3-thianaphthenyl)ethylacetamide

To 5.6 g. (0.03 mole) of β-(3-thianaphthenyl)ethylamine is added 72 ml. of 20% sodium hydroxide solution with cooling in 10 minutes. Acetic anhydride (20 ml.) is then added dropwise with cooling within 15 minutes, after which the mxture is stirred with cooling for 1 hour and at room temperature for 16 hours. The mixture is extracted three times with 100 ml. portions of ether. The extracts are combined and washed three times with 50 ml. of brine, dried, and concentrated in vacuo to yield a clear liquid which is crystallized from benzene/petroleum-ether to yield N-β-(3-thianaphthenyl)ethylacetamide in the form of a white crystalline solid, M.P. 67–68.5°

*Analysis.*—Calcd. for $C_{12}H_{13}NOS$ (percent): S, 14.62. Found (percent): S, 14.73.

EXAMPLE 3

N-acryloyl-β-(3-thianaphthenyl)ethylamine

To a solution of 5.2 g. (0.0294 mole) of β-(3-thianaphthenyl)ethylamine and 3.3 g. (0.033 mole) of triethylamine in 60 ml. of anhydrous benzene is added dropwise with cooling (ice water bath) and stirring 2.7 g. (0.03 mole) of acryloyl chloride in 50 ml. of anhydrous benzene. The addition requires about 15 minutes. The mixture is stirred at 5–10° for 2 hours and at room temperature overnight. The reaction mixture is washed successively with 100 ml. portions of water, 5% sodium bicarbonate solution, 10% HCl solution, and water. The benzene solution is dried over anhydrous sodium sulfate and the solvent distilled under diminished pressure to give N-acryloyl-β-(3-thianaphthenyl)ethylamine as a white crystalline solid. After one recrystallization from benzene-cyclohexane a white crystalline solid, M.P. 90° is obtained.

*Analysis.*—Calcd. for $C_{13}H_{13}NOS$ (percent): C, 67.51; H, 5.66; N, 6.06; S, 13.86. Found (percent): C, 67.63; H, 5.69; N, 5.80; S, 13.60.

EXAMPLE 4

N-propionyl-β-(3-thianaphthenyl)ethylamine

To a solution of 6.15 g. (0.663 mole) of propionyl chloride in 60 ml. of benzene is added a solution of 5.2 g. (0.0663 mole, 5.3 ml.) of pyridine and 10 g. (0.0564 mole) of β-(3-thianaphthenyl)ethylamine in 50 ml. of benzene in 0.5 hour at 0°, and the mixture is stirred at 25° for 16 hours. Water (100 ml.) is added and stirred 5 minutes. The organic layer is separated, washed with 100 ml. of 10% hydrochloric acid and 50 ml. of brine, dried and concentrated to yield an oil which is crystallized twice from benzene/petroleum ether to yield N-(propionyl)-β-(3-thianaphthenyl)ethylamine in the form of a white solid, M.P. 71–72.5°.

*Analysis.*—Calcd. for $C_{13}H_{15}NOS$ (percent): C, 66.92; H, 6.48; N, 6.01; S, 13.74. Found (percent): C, 67.12; H, 6.18; N, 6.12; S, 13.97.

EXAMPLE 5

N-(p-methoxyphenylacetyl)-β-(3-thianaphthenyl)-ethylamine

A mixture of 3.9 g. (0.023) of p-methoxyphenylacetic acid and 33 g. (0.28 mole, 20 ml.) of thionyl chloride is heated at 50–65° for 1 hour. The excess thionyl chloride is removed in vacuo and 30 ml. of benzene is added and concentrated to yield a yellow oil. The oil is dissolved in 50 ml. of benzene and a solution of 3.3 g. (0.19 mole) of β-(3-thianaphthenyl)ethylamine and 1.84 g. (0.23 mole, 1.9 ml.) of pyridine in 50 ml. of benzene added in 10 minutes at 25–40°. The mixture is stirred at 25° for 3 hours after which 75 ml. of water is added and stirred 10 minutes. The organic layer is separated and washed successively with 75 ml. of 10% hydrochloric acid, twice with 75 ml. 5% sodium bicarbonate solution, 50 ml. brine, dried and concentrated to yield an oil which crystallizes. The solid is recrystallized twice from benzene/petroleum ether to yield N-(p-methoxyphenylacetyl)-β-(3-thianaphthenyl)ethylamine in the form of a white solid, M.P. 90.5–91.5°.

*Analysis.*—Calcd. for $C_{19}H_{18}NO_2S$ (percent): C, 70.37; H, 5.59; N, 4.32; S, 9.88. Found (percent): C, 70.15; H, 5.67; N, 4.32; S, 9.72.

EXAMPLE 6

N-iso-butyryl-β-(3-thianaphthenyl)ethylamine

To a cooled solution of 15 g. (0.14 mole) of isobutyryl chloride in 150 ml. of benzene is added a solution of 25 g. (0.14 mole) of β-(3-thianaphthenyl)ethylamine and 11.2 g. (0.14 mole) of pyridine in 75 ml. of benzene in 1 hour, after which it is stirred at 25° for 18 hours. Water (150 ml.) is added and stirred 0.5 hour, the organic layer is separated, washed with 100 ml. of 10% HCl solution and then stirred for 0.5 hour with 100 ml. of 5% NaOH solution. It is then washed with 50 ml. of brine, dried and concentrated to yield a yellow solid, which is recrystallized twice from benzene/petroleum ether to yield N-iso-butyryl-β-(3-thianaphthenyl)ethylamine in the form of a brown crystalline solid, M.P. 89.5–91.5°.

*Analysis.*—Calcd. for $C_{14}H_{17}NOS$ (percent): S, 12.96. Found (percent): S, 13.26.

EXAMPLE 7

N-butyryl-β-(3-thianaphthenyl)ethylamine

To a cooled solution of 17.7 g. (0.17 mole) of butyryl chloride in 150 ml. of benzene is added a solution of 25 g. (0.14 mole) of β-(3-thianaphthenyl)ethylamine and 13.2 g. (0.17 mole) of pyridine in 75 ml. of benzene in 1 hour and the mixture stirred at 25° for 3.5 hours. Water (100 ml.) is added and the mixture stirred 5 minutes. The organic layer is separated and washed with 100 ml. of 10% HCl after which it is added to 100 ml. of 5% NaOH solution and stirred for 1.5 hours. The organic layer is separated, washed with 75 ml. of brine and concentrated to yield an oil which is distilled to yield N-butyryl-β-(3-thianaphthenyl)ethylamine in the form of a light yellow oil, B.P. 166–167°/0.03 mm.

Analysis.—Calcd. for $C_{14}H_{17}NOS$ (percent): S, 12.96. Found (percent): S, 13.13.

EXAMPLE 8

Diethyl α-(5-chloro-3-thianaphthenylmethyl)malonate

To a solution of 3.8 g. (0.16 mole) of Na in 175 ml. of ethanol is added 33 g. (0.2 mole) of diethyl malonate and the mixture is stirred 1 hour at 25°. A solution of 35.6 g. (0.14 mole) of 5-chloro-3-bromoethylthianaphthene in 100 ml. of benzene is added in 15 minutes, the mixture is stirred at 25° for 1 hour and refluxed 7 hours. The solution is cooled diluted to 1.5 liters with water and extracted three times with 200 ml. portions of ether. The combined extracts are washed twice with 75 ml. portions of brine, dried and concentrated to yield diethyl α-(5-chloro-3-thianaphthenylmethyl)malonate in the form of a yellow oil.

EXAMPLE 9

α-(5-chloro-3-thianaphthenylmethyl)malonic acid

To a solution of 45.2 g. of KOH in 45 ml. if water is added 100 ml. of ethanol and 45.2 g. (0.13 mole) of diethyl α-(5-chloro-3-thianaphthenylmethyl)malonate and the mixture is refluxed 22 hours. The alcohol is removed in vacuo after which 200 ml. of water is added and the mixture extracted twice with 100 ml. portions of ether. The aqueous solution is treated with activated charcoal, acidified with concentrated HCl and cooled. The solids are collected and dried to yield α-(5-chloro-3-thianaphthenylmethyl)malonic acid in the form of a yellow solid, M.P. 175–177°.

Analysis.—Calcd. for $C_{12}H_9ClO_4S$ (percent): S, 11.26. Found (percent): S, 11.42.

EXAMPLE 10

β-(5-chloro-3-thianaphthenyl)propionic acid

α-(5-chloro-3-thianaphthenylmethyl)malonic acid (13.5 g., 0.048 mole) is heated at 190–195° for two hours. It is cooled to 25° and 75 ml. of 10% NaOH solution was added and heated on a steam bath until the mixture is dissolved. The mixture is cooled, extracted twice with 35 ml. of chloroform, treated with activated charcoal and acidified with 10% HCl solution. The solids are collected, washed and dried to yield β-(5-chloro-3-thianaphthenyl)-propionic acid. An analytical sample is prepared by recrystallizing twice from ethanol and twice from methanol to yield β-(5-chloro-3-thianaphthenyl)propionic acid in the form of a yellow solid, M.P. 187–189°.

Analysis.—Calcd. for $C_{11}H_9ClO_2S$ (percent): C, 54.91; H, 3.77; Cl, 14.74; S, 13.32. Found (percent): C, 55.09; H, 3.79; Cl, 14.83; S, 13.27.

EXAMPLE 11

β-(5-chloro-3-thianaphthenyl)

A mixture of 26.8 g. (0.11 mole) of α-(5-chloro-3-thianaphthene)propionic acid and 57 g. (35 ml., 0.48 mole) of $SOCl_2$ is heated to 50° in 0.5 hour and maintained at 50–52° for 1 hour. The excess $SOCl_2$ is removed in vacuo. Benzene (50 ml). is added to the residue and concentrated to yield 30 g. (theory 29 g.) β-(5-chloro-3-thianaphthenyl)propionyl chloride in the form of a yellow solid.

A mixture of 32 g. (0.12 mole) of β-(5-chloro-3-thianaphthenyl)propionyl chloride and 34 g. (0.51 mole) of $NaN_3$ in 200 ml. of toluene is refluxed for 23.5 hours. The mixture is cooled, filtered and the filtrate concentrated to yield a brown oil.

To the above oil is added 100 ml. of concentrated HCl with stirring at 25° for 15 minutes, at 80° for 0.5 hour after which it is refluxed for 6 hours. The mixture is cooled to 25° and 100 ml. of ether added and stirred 0.5 hour. The solids are collected, washed with ether and dried to yield a solid, M.P. 215–237°. An analytical sample is prepared by recrystallizing from activated charcoal-treated ethanol to yield β-(5-chloro-3-thianaphthenyl)-ethylamine hydrochloride in the form of a white solid, M.P. 248–250°.

Analysis.—Calcd. for $C_{10}H_{11}Cl_2NS$ (percent): C, 48.38; H, 4.47; N, 5.64; S, 12.91. Found (percent): C, 48.18; H, 4.64; N, 5.48; S, 13.02.

EXAMPLE 12

N-(3,4-dimethoxyphenylacetyl)-β-(3-thianaphthenyl) ethylamine

A solution of 16.7 g. (0.085 mole) of 3,4-dimethoxyphenyl acetic acid in 25.6 ml. (0.36 mole) of $SOCl_2$ is stirred at 20–30° for 1.5 hours. The excess $SOCl_2$ is removed in vacuo, after which the residue is dissolved in 50 ml. of benzene and concentrated to yield 18.2 g. (100%) of a brown oil. The oil is dissolved in 100 ml. of benzene and to it is added a solution of 12.6 g. (0.07 mole) of β-(3-thianaphthenyl)ethylamine and 6.4 g. (0.08 mole) of pyridine in 50 ml. of benzene in 20 minutes at 10–11°. The mixture is stirred at 25° for 1 hours after which 200 ml. of $CHCl_3$ and 75 ml. of $H_2O$ are added and stirred. The organic layer is separated and washed successively with 100 ml. of 10% HCl solution, twice with 100 ml. portions of 5% NaOH solution and once with 100 ml. of brine. It is then treated with activated charcoal and concentrated to yield an oil which is crystallized and recrystallized from ethyl acetate to yield N-(3,4-dimethoxyphenylacetyl)-β-(3-thianaphthenyl)ethylamine in the form of a yellow solid, M.P. 103–105°.

EXAMPLE 13

N-(3,4-dihydroxyphenylacetyl)-β-(3-thianaphthenyl) ethylamine

A mixture of 4.0 g. (0.0113 mole) of N-(3,4-dimethoxyphenylacetyl)-β-3-(thianaphthenyl)ethylamine and 8 g. (0.069 mole) of pyridine hydrochloride is heated at 200° for 3 hours. It is poured into 250 ml. of water to yield an oily precipitate which crystallizes upon scratching and cooling. The solids are recrystallized from aqueous ethanol to yield N-(3,4-dihydroxyphenylacetyl)-β-(3-thianaphthenyl)ethylamine in the form of a light brown solid, M.P. 153–155°.

Analysis.—Calcd. for $C_{18}H_{17}NO_3S$ (percent): S, 9.79. Found (percent): S, 9.51.

EXAMPLE 14

N-[β-(5-chloro-3-thianaphthenyl)ethyl]ethylurethan

To a solution of 0.9 g. (0.004 mole) of β-(5-chloro-3-thianaphthenyl)ethylamine and 0.54 g. (0.005 mole) of triethylamine in 50 ml. of ether is added a solution of 0.58 g. (0.005 mole) of ethyl chloroformate in 25 ml. of ether in 10 minutes at 0°. The mixture is stirred at 25° for 16 hours. Water (100 ml.) is added and stirred 10 minutes. The organic layer is separated, and washed with 35 ml. of brine and concentrated to yield N-[β-(5-chloro-3-thianaphthenyl)ethyl]ethylurethan in the form of a yellow oil.

Analysis.—Calcd. for $C_{13}H_{14}ClNO_2S$ (percent): C, 55.02; H, 4.97; N, 4.94; S, 11.31. Found (percent): C, 55.36; H, 5.37; N, 4.61; S, 11.13.

EXAMPLE 15

N-methyl-β-(5-chloro-3-thianaphthenyl)ethylamine hydrochloride

To a dispersion of 4 g. (0.106 mole) of $LiAlH_4$ in 150 ml. of ether is added a solution of 5 g. (0.0176 mole) of N-[β-(5-chloro-3-thianaphthenyl)ethyl]ethylurethan in 100 ml. of ether in 10 minutes after which it is refluxed for 8 hours. The complex is decomposed with 30 ml. of water and the mixture filtered. The filtrate is concentrated to yield an oil which is redissolved in 100 ml. of ether and acidified with ethereal HCl. The solids are collected and recrystallized from 2-propanol to yield N-methyl-β-(5-chloro-3-thianaphthenyl)ethylamine hydrochloride in the form of light green crystals, M.P. 208–211.5°.

*Analysis.*—Calcd. for $C_{11}H_{13}Cl_2NS$ (percent): C, 50.38; H, 4.99; N, 5.34. Found (percent): C, 50.80; H, 5.25; N, 5.21.

EXAMPLE 16

N-[β-(N-methylpiperazino)propionyl]-β'-(3-thianaphthenyl)ethylamine dihydrochloride methanolate A solution of 2.2 g. (0.007 mole) of N-acryloyl-β-(3-thianaphthenyl)ethylamine and 0.71 g. (0.007 mole) of N-methylpiperazine in 35 ml. of benzene is heated in a 200 ml. pressure bottle at 100° for 6 hours. It is cooled and concentrated to yield an oil which is dissolved in 100 ml. of methanol, acidified with ethereal HCl and diluted with ether. The solids are collected and recrystallized three times from methanol to yield N-[β-(N-methylpiperazino)propionyl]-β'-(3-thianaphthenyl) ethylamine dihydrochloride methanolate in the form of a white crystalline solid, M.P. 224–226°.

*Analysis.*—Calcd. for $C_{19}H_{31}N_3O_2S$ (percent): C, 52.28; H, 7.16; N, 9.63. Found (percent): C, 52.39; H, 6.83; N, 9.30.

EXAMPLE 17

N-(β'-diethylaminopropionyl)-N-methyl-β-(5-chloro-3-thianaphthenyl)ethylamine hydrochloride A mixture of 5.12 g. (0.0282 mole) of 3-diethylamino)-propionic acid hydrochloride and 11 ml. (0.15 mole) of $SOCl_2$ is heated to 40–45° for 1 hour. It was concentrated in vacuo at 45° and the residue dissolved in 30 ml. of benzene and concentrated again to yield an orange solid.

The acid chloride is dissolved in 50 ml. of dried $CHCl_3$ and at 5° a solution of 5.1 g. (0.023 mole) of N-methyl-β-(5-chloro - 3 - thianaphthenyl)ethylamine and 5.2 g. (0.051 mole) of triethylamine in 50 ml. of dried $CHCl_3$ is added in 0.5 hour. It is stirred at 25° for 1.5 hours, heated to 50° in 0.5 hour and maintained at 50° for 0.5 hour. It is then concentrated to yield a solid which is dissolved in 300 ml. of water and basified with 10% NaOH solution and extracted 3 times with 75 ml. portions of ether. The extracts are dried and concentrated to yield a brown oil which is dissolved in 300 ml. of ether, treated with activated charcoal and acidified with ethereal HCl. The mixture is concentrated to yield a viscous residue which is crystallized from 2-propanol/ether to yield N-(β'-diethylaminopropionyl)-N-methyl-β-(5-chloro - 3 - thianaphthenyl)ethylamine hydrochloride in the form of a light brown solid; M.P. 141–143°.

*Analysis.*—Calcd. for $C_{18}H_{26}Cl_2N_2OS$ (percent): C, 55.51; H, 6.73; N, 7.20; S, 8.23. Found (percent): C, 56.01; H, 7.10; N, 7.03; S, 8.16.

EXAMPLE 18

N-(3,4,5-trimethoxyphenylacetyl)-β-(3-thianaphthenyl)ethylamine

To a solution of 4.5 g. (0.02 mole) of 3,4,5-trimethoxyphenylacetic acid and 2.0 g. (0.02 mole) of triethylamine in 50 ml. of dry dichloromethane cooled to −15° is added a solution of 3.13 g. (0.023 mole) of isobutylchloroformate in 15 ml. of dichloromethane in 10 minutes. The solution is stirred for 0.5 hour at −10 to −15° after which a solution of 3.52 g. (0.02 mole) of β-(3-thianaphthenyl)ethylamine in 50 ml. of dichloromethane is added in 10 minutes. The mixture is stirred at −10° to 0° for 0.5 hour, at 3° for 3 hours and at 25° for 48 hours. Water (100 ml.) is added and the mixture stirred. The organic layer is separated and washed successively with 100 ml. portions of 5% $NaHCO_3$ solution, water, 10% HCl solution and water. It is dried ($Na_2SO_4$) and concentrated in vacuo to yield an oil which is crystallized and recrystallized twice more from ethyl acetate to yield N-(3,4,5-trimethoxyphenylacetyl)-β-(3-thianaphthenyl)ethylamine in the form of brown needles, M.P. 112–113°.

*Analysis.*—Calcd. for $C_{21}H_{23}NO_4S$ (percent): C, 65.42; H, 6.01; N, 3.63; S, 8.32. Found (percent): C, 65.37; H, 6.11; N, 3.85; S, 8.33.

I claim:
1. A compound of the formula

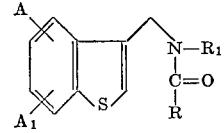

in which A and $A_1$ are selected from hydrogen, hydroxy, nitro, lower alkyl of 1 to 4 carbon atoms, lower alkoxy, trifluoromethyl and halo, $R_1$ is hydrogen, a lower alkyl of 1 to 4 carbon atoms or a phenyl-lower alkyl, and R is a halo-substituted phenyl-lower alkyl, an lower alkoxy-substituted phenyl-lower alkyl, or a hydroxy-substituted phenyl-lower alkyl.

2. A compound of claim 1 in which R is 3,4 - dimethoxybenzyl.

3. A compound of claim 1 in which R is p-methoxybenzyl.

4. A compound of claim 1 in which R is 3,4-dihydroxybenzyl.

5. A compound of claim 1 in which R is 3,4,5-trimethoxybenzyl.

References Cited

Herz, "Journal of the America Chemical Society," vol. 72 (1950), pp. 4999–5001.

ALEX MAZEL, Primary Examiner

J. H. TURNIPSEED, Assistant Examiner

U.S. Cl. X.R.

260—247.1, 268, 293.4, 326.82; 424—248, 250, 267, 275

UNITED STATES PATENT OFFICE
CERTIFICATE OF CORRECTION

Patent No. 3,528,994  Dated September 30, 1970
(Page 1)

Inventor(s) John T. Suh

It is certified that error appears in the above-identified patent and that said Letters Patent are hereby corrected as shown below:

Column 1, line 55 - "α-cyclohexl" should be -- α-cyclohexyl --.

Column 2, line 2 - "hydroxethyl" should be -- hydroxyethyl --.

Column 3, lines 30 - 40, second formula -

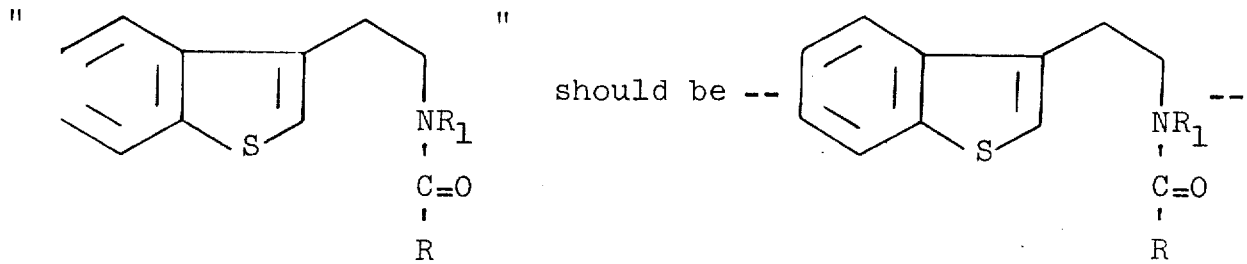

Column 6, line 46 - "N-[β-chloro-3-" should be
    -- N-[β-(5-chloro-3- --.

Column 6, line 62 - "tetrahydrobendothieno" should be
    -- tetrahydrobenzothieno --.

Column 7, line 36 - "109-10°" should be -- 109-110° --.

Column 7, line 75 - "M.P. 90°" should be -- M.P. 95° --.

Column 8, line 27 - "(0.023) should be -- (0.023 mole) --.

Column 9, line 27 - "if" should be -- of --.

Column 8, line 32 - "(0.19 mole)" should be -- (0.019 mole) --.

UNITED STATES PATENT OFFICE
CERTIFICATE OF CORRECTION

Patent No. 3,528,994      Dated September 30, 1970
(Page 2)

Inventor(s) John T. Suh

It is certified that error appears in the above-identified patent and that said Letters Patent are hereby corrected as shown below:

Column 9, line 60 - "β-(5-chloro-3-thianaphthenyl)"

should be    -- β-(5-chloro-3-thianaphthenyl)ethylamine hydrochloride --.

Column 9, lines 61 & 62 - "α-(5-chloro-3-thianaphthene)

should be    -- β-(5-chloro-3-thianaphthenyl) --.

Column 9, line 71 - "NanN$_3$" should be -- NaN$_3$ --.

Column 10, line 41 & 42 - "N-(3,4-dimethoxyphthenylacetyl)

should be    -- N-(3,4-dimethoxyphenylacetyl) --.

SIGNED AND SEALED
DEC 1 - 1970

DEC. 1, 1970

(SEAL)
Attest:

Edward M. Fletcher, Jr.
Attesting Officer

WILLIAM E. SCHUYLER, JR.
Commissioner of Patents